United States Patent
Kasser et al.

(10) Patent No.: US 7,747,791 B2
(45) Date of Patent: Jun. 29, 2010

(54) PROGRAM ACCESS AUTHORIZATION OF PERIPHERAL DEVICES VIA A SMART CARD

(75) Inventors: Bernard Kasser, Ceyreste (FR); William Orlando, Peynier (FR); Stephan Courcambeck, Plan de Cuques (FR)

(73) Assignee: STMicroelectronics S.A., Montrouge (FR)

( * ) Notice: Subject to any disclaimer, the term of this patent is extended or adjusted under 35 U.S.C. 154(b) by 349 days.

(21) Appl. No.: 10/934,136

(22) Filed: Sep. 3, 2004

(65) Prior Publication Data

US 2005/0055477 A1     Mar. 10, 2005

(30) Foreign Application Priority Data

Sep. 4, 2003    (FR) .................. 03 50501

(51) Int. Cl.
  *G06F 13/28* (2006.01)
  *G06F 3/00* (2006.01)
  *G06F 7/04* (2006.01)

(52) U.S. Cl. ..................... 710/15; 710/18; 710/36; 726/2; 726/26

(58) Field of Classification Search ............. 710/15, 710/18
  See application file for complete search history.

(56) References Cited

U.S. PATENT DOCUMENTS

| | | | | |
|---|---|---|---|---|
| 5,434,562 A * | 7/1995 | Reardon | ................ | 726/34 |
| 6,003,135 A * | 12/1999 | Bialick et al. | .............. | 726/29 |
| 6,212,635 B1 * | 4/2001 | Reardon | ................ | 713/165 |
| 7,131,139 B1 * | 10/2006 | Meier | ................ | 726/4 |
| 2002/0019941 A1 | 2/2002 | Chan et al. | | |
| 2002/0026578 A1 * | 2/2002 | Hamann et al. | ........... | 713/159 |
| 2002/0040438 A1 * | 4/2002 | Fisher, Jr. | ............. | 713/200 |
| 2002/0087877 A1 * | 7/2002 | Grawrock | ............. | 713/200 |
| 2002/0174353 A1 * | 11/2002 | Lee | ........... | 713/193 |
| 2002/0188869 A1 * | 12/2002 | Patrick | ........... | 713/201 |
| 2003/0009687 A1 * | 1/2003 | Ferchau et al. | ........... | 713/200 |
| 2003/0065982 A1 | 4/2003 | Grimaud et al. | | |
| 2004/0098591 A1 * | 5/2004 | Fahrny | ........... | 713/176 |
| 2004/0243824 A1 * | 12/2004 | Jones | ........... | 713/200 |
| 2005/0136964 A1 * | 6/2005 | Le Saint et al. | ........... | 455/522 |

(Continued)

FOREIGN PATENT DOCUMENTS

FR   2 802 319 A   6/2001

OTHER PUBLICATIONS

French Search Report from corresponding French National Application No. 0350501, filed Sep. 4, 2003.

(Continued)

*Primary Examiner*—Alan Chen
(74) *Attorney, Agent, or Firm*—Lisa K. Jorgenson; James H. Morris; Wolf, Greenfield & Sacks, P.C.

(57) ABSTRACT

A method and a system of access control between a main processor and peripherals connected by a communication bus, including assigning, to all or part of the programs to be executed by the main processor, at least one token selectively authorizing access to one or several of said peripherals, said token being provided at least initially by an auxiliary processor exploiting a memory distinct from that of the main processor; and checking, for each request of access of one of said programs to one of said peripherals, the presence of said authorization token for the access to the concerned peripheral.

15 Claims, 1 Drawing Sheet

U.S. PATENT DOCUMENTS

2007/0276969 A1* 11/2007 Bressy et al. .................. 710/48

OTHER PUBLICATIONS

Gong, L, *A Secure Identity-Based Capability System*, Proceedings of the Symposium on Security and Privacy, Oakland, May 1-3, 1989, Washington IEEE Comp. Soc. Press, US. May 1, 1989, pp. 56-63, XP010016007.

Smit G.J.M. et al., *The Harpoon Security System for Helper Programs on a Pocket Companion*, Euromicro 97, New Frontiers of Information Technology, Proceedings of the 23$^{rd}$ Euromicro Conference Budapest, Hungary Sep. 1-4, 1997, Los Alamitos, CA IEEE Comput. Soc, Sep. 1, 1997, pp. 231-238, XP010243976.

Sandhu R.S. et al., *Access Control: Principles and Practice*, IEEE Communications Magazine, IEEE Service Center, Piscataway, NJ, vol. 32, No. 9, Sep. 1, 1994, pp. 40-48, XP000476554.

European Search Report from a corresponding European Application No. 04104270.

* cited by examiner

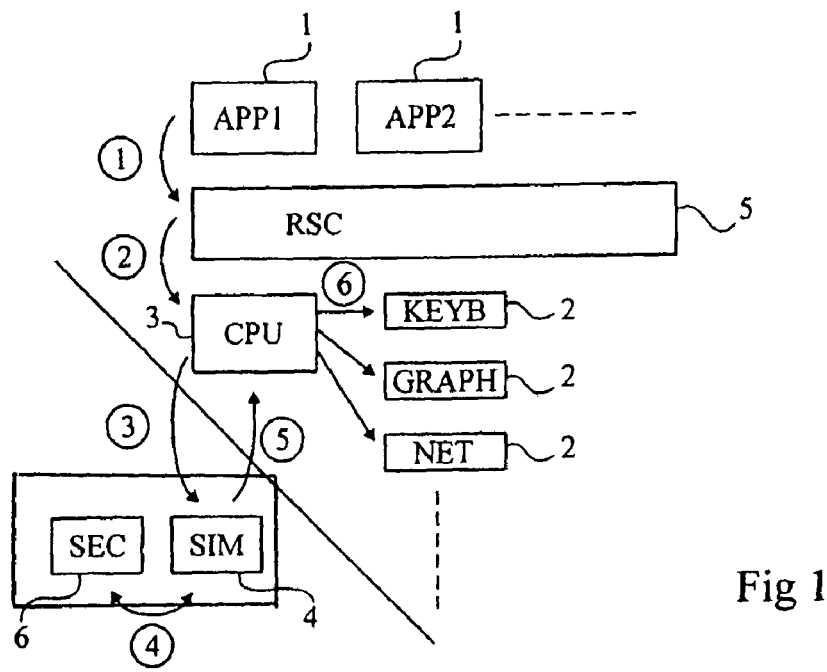
Fig 1
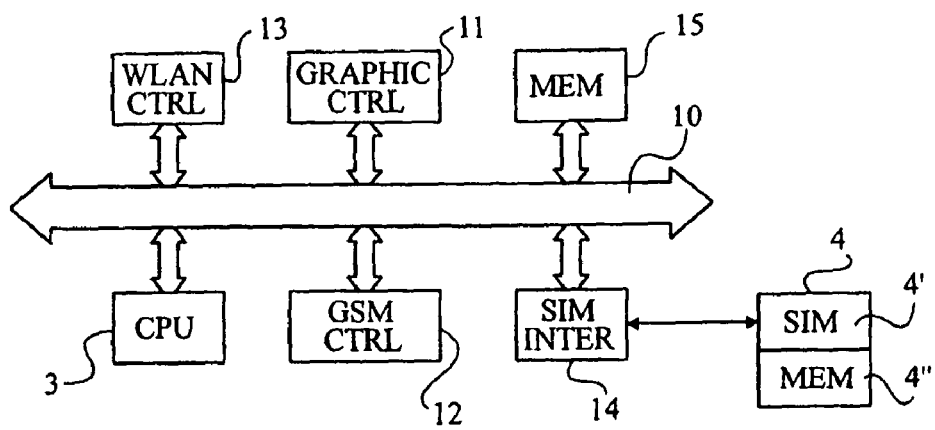
Fig 2
Fig 3

PROGRAM ACCESS AUTHORIZATION OF PERIPHERAL DEVICES VIA A SMART CARD

BACKGROUND OF THE INVENTION

1. Field of the Invention

The present invention generally relates to the control of the access to resources exploited by a microprocessor. More specifically, the present invention relates to the control of the access to peripherals exploited by at least one main processor according to the applications (software) executed by this microprocessor and to the rights of access which are respectively granted thereto.

2. Discussion of the Related Art

"Microprocessor peripheral" is used to designate a physical device communicating with a microprocessor over a bus and used, most often, as an interface with another device (for example, a network connection, a graphics board, a keyboard, a memory, etc.).

The development of communicating computer systems and of program downloads over communication networks which are not necessarily secure has caused problems in the execution of programs by processor systems. Among these problems, the present invention more specifically relates to those linked to the access given to peripherals of the system in unauthorized fashion by programs. Indeed, despite all authentication, cryptography, and systems which currently control authenticity or the validity of a program loaded in the memory of a processor system, there remains a risk of fraudulent or incidental attempt of access by the program to resources of the system in which it has been validly installed.

An example of an application of the present invention relates to mobile systems of a GSM type. In such an application, the user authentication is performed via its smart card (SIM card) which contains information such as an access key to the GSM network. With the development of telephone devices that are becoming more and more open in terms of executable applications (communicating computers, PDA, etc.), an application is likely to have access to telephone resources which are not intended for it. Such an access may result, for instance, in an incidental or voluntary blocking of the SIM card without this to have been desired by the user or the operator, or yet during an access to another parallel network (wireless local area network—WLAN—or the like) with no control by the GSM operator. Further, this makes systems more vulnerable to viruses or pirate access.

Another example application of the present invention relates to broadcast signal receivers/decoders (set top boxes) which allow viewing by a television set of certain signals received according to a key contained in a smart card, and defining the channels accessible by the user. The smart card is used to decipher the data or to provide the access key to the data formed by the diffused programs. The decoder also enables downloading applications, such applications being likely to come from sources uncontrolled by the operator (for example, the Internet). However, all the internal resources of the decoder are then potentially accessible to these applications, which is a weakness in terms of system security.

SUMMARY OF THE INVENTION

The present invention aims at providing a novel architecture for controlling the access to peripherals used by a main processor from a secondary processor of smart card type.

The present invention also aims at providing a novel architecture for managing the access to at least two different communication networks by the same device.

To achieve these and other objects, the present invention provides a method of access control between a main processor and peripherals connected by a communication bus, comprising: assigning, to all or part of the programs to be executed by the main processor, at least one token selectively authorizing access to one or several of said peripherals, said token being provided at least initially by an auxiliary processor exploiting a memory distinct from that of the main processor; and checking, for each request of access of one of said programs to one of said peripherals, the presence of said authorization token for the access to the concerned peripheral.

According to an embodiment of the present invention, said token is provided by said auxiliary processor on each access request.

According to an embodiment of the present invention, said token is provided by said auxiliary processor upon installation or new use of a program, to define the peripherals to which it will further have access.

According to an embodiment of the present invention, said auxiliary processor configures a unit for managing the access to the main processor memory by provision of said token.

According to an embodiment of the present invention, at least two of said peripherals are formed of an access card for a mobile telephone network and an access card for a wireless local area network, said auxiliary processor authorizing or not authorizing access to one of the networks on each call request completed by the main processor.

According to an embodiment of the present invention, said auxiliary processor is contained in a smart card.

According to an embodiment of the present invention, said auxiliary processor forms one of said peripherals.

The present invention also provides a system for controlling the access to peripherals communicating with a main processor via a bus, comprising a means for exploiting information provided by an auxiliary processor authorizing or not the access to a given peripheral by a program executed by the main processor.

According to an embodiment of the present invention, a peripheral is at least formed of an interface of access to a communication network of local area network or mobile telephone type.

The present invention also provides an electronic assembly (for example, a mobile phone, a "set top box", or a computer) comprising a processor (main processor in the meaning of the present invention), the access to the peripherals of which is desired to be controlled.

The present invention also provides an electronic component (for example, a smart card) comprising a processor (auxiliary processor in the meaning of the present invention) managing the rights of access to the peripherals of a distinct electronic assembly.

The foregoing objects, features, and advantages of the present invention will be discussed in detail in the following non-limiting description of specific embodiments in connection with the accompanying drawings.

BRIEF DESCRIPTION OF THE DRAWINGS

FIG. 1 schematically illustrates in the form of blocks an embodiment of the access control method according to the present invention;

FIG. 2 illustrates an example of the structure of an access control table according to the present invention; and FIG. 3 schematically shows in the form of blocks an example of a processor system architecture to which the present invention applies.

DETAILED DESCRIPTION

The same elements have been designated with the same references in the different drawings. For clarity, only those steps and elements which are necessary to the understanding of the present invention are shown in the drawings and will be described hereafter. In particular, the resources or peripherals exploited by the main processor under control of the present invention have not been described in detail, the present invention applying to known systems.

A feature of the present invention is to use a smart card, or more generally an auxiliary processor provided with its own memory, to manage the access of the programs executed by a main processor of a system separate from the card to the different peripherals of the main processor.

A significant difference between the present invention and existing systems is that, in existing systems, the security policy generally consists of charging the main processor and its exploitation system, to check the authorization of execution of a given application. Further, in the case where this checking is performed based on a key contained in a distant smart card, it is limited to an integrity and authenticity control, followed by an authorization of installation and execution, the peripheral access control being managed by the main processor.

Conversely, according to the present invention, the decision to authorize or not authorize access to given peripherals for a given application is, at least partially, taken by the auxiliary processor (of the smart card). The main processor does not have the function to modify access controls defined by the smart card, only the function of applying it. This enables protection of the smart card against attacks aiming at locking the system, and controlling the access to different resources.

FIG. 1 schematically illustrates in the form of blocks an embodiment of the present invention. The representation of this drawing is functional and very simplified.

Several application programs 1 (APP1, APP2) are likely to require access to peripherals 2 of a main microprocessor 3 (CPU). The peripherals are, for example, a keyboard KEYB, a graphic interface GRAPH, and access to the Internet network NET, etc. Microprocessor 3 is capable of communicating with a smart card and more specifically with its processor 4 (SIM) Subscriber Identity Module.

When an application 1 needs accessing to one of peripherals 2, its request is intercepted by a resource access controller or driver (block 5, RSC). This manager is, for example, contained in the kernel of the operating system of a conventional architecture. Such an interception amounts to dividing into several steps a usually direct access between the application and the resource. A first step ① concerns the request for access to a peripheral directed to the controller 5, the access controller relays this request towards smart card 4 via the CPU (steps ② and ③).

According to the present invention, card 4 decides to authorize access according (step ④) to criteria or to a security policy that it contains (block 6, SEC). This security policy is, for example, embodied by a double-entry table as will be described hereafter in relation with FIG. 2, or by any other usual rule or acceptation criteria to provide or not provide access to the requested resource. Card 4 answers (step ⑤) to microprocessor 3. If the access is allowed, microprocessor 3 then allows the application access to the corresponding resource (step ⑥).

Of course, the different exchanges between the processor and the smart card may use ciphering or cryptography processes, independently from the operation of the present invention.

The acceptation of the access by the smart card may be compared to the provision of an access authorization token to main processor 3 according to a request thereof for a request of access to a given peripheral by a given application. Conversely to conventional authentication systems, this token is however not a key validating the actual program, nor authenticating it. Conventional key authentication systems can actually be combined with the present invention, and so can systems for ciphering communications (for example, with public and private keys) between the card and the main systems and/or between this system and its peripherals.

According to a first implementation mode, the process discussed in FIG. 1 is performed on each request for access by any application to a peripheral, that is, the smart card is permanently required to provide in real time the access authorization.

According to another implementation mode, the access authorizations are given or generated by the smart card upon first use or upon installation of the application in the system comprising the main processor. For example, these authorizations are then interpreted in software fashion or as a configuration of a unit (not shown) for managing the access to the memory of processor 3 (for example, a unit known as a "memory management unit"). In this last case, only the smart card has the possibility of writing or modifying the configuration of the memory management unit, so that the main processor can take no decision as to the access control, but only applies the rules written by the smart card into the memory management unit.

FIG. 2 illustrates in a table form, an example of implementation of the access control according to the present invention authorizing access (X) to given peripherals or resources (RES1, RES2, RES3) for one or several applications (APP1, APP2, APP3) or groups of applications (GP1, GP2). Indeed, the implementation of the present invention is compatible with the gathering of the applications in families to authorize given types of peripherals or resources to given application families. Such assignment rules may of course be combined with individual access authorizations for given peripherals.

FIG. 3 schematically shows in the form of blocs an example of an architecture to which the present invention applies. The example of a mobile phone having its main processor 3 (CPU) communicating via a bus 10 with different peripherals, among which a graphic peripheral 11 (GRAPHIC CTRL), a GSM-type telephone network access peripheral 12 (GSM CTRL), a wireless local area network access peripheral 13 (WLAN CTRL), an interface with smart card 14 (SIM INTER), and one or several memories 15 (MEM), is here assumed in simplified fashion. Of course, the number of peripherals communicating with CPU 3 via bus 10 is not limited and other peripherals (for example, a keyboard, a supply interface, the auxiliary processor or other processors, etc.) have access to bus 10 and can be controlled by the present invention.

Smart card 4 is symbolized by an auxiliary process 4' (SIM) and a memory 4" (MEM) containing the security rules assigned to the system.

The implementation of the access control method of the present invention to the an architecture such as illustrated in FIG. 3 enables differentiation, according to the content of security rules stored in card 4, access to a GSM type network can be differentiated from access to a (WLAN) wireless local area network.

An advantage of the present invention is that the system peripheral access control policy or criteria are set by the distant smart card and managed by the card. Thus, the same device can be integrally controlled by the smart card without enabling a pirate application to have access, even after possible authentication by the card, to unauthorized peripherals, as is the case in conventional architectures.

Another advantage of the present invention is that, in the case where the auxiliary processor updates the configuration of the memory access management unit of the main processor, it guarantees the absence of piracy, even via the downloading of pirate applications via a connection of an external network, for example, of Internet type, to the main processor.

Another advantage of the present invention is that its implementation applied to a mobile phone system allows differentiation and management of the rights of access to different networks by the smart card only, and thus by the network operator.

Of course, the present invention is likely to have various alterations, modifications and improvements which will readily occur to those skilled in that art. In particular, the practical implementation of the present invention based on the functional indications given hereabove and using known tools is within the abilities of those skilled in the art.

Further, although the present invention has been described in relation with control of access to several peripherals, the same peripheral may perform several functions and then be considered as several different resources in the meaning of the present invention. For example, the access control system may be used to control the access to specific registers equipping a same peripheral of a microprocessor, which are particularly critical in terms of security (for example, masking registers for interrupt controllers, data registers, etc.).

Moreover, although the present invention has been described in relation with an auxiliary processor contained in a smart card which is a preferred embodiment, it is not excluded for this auxiliary processor would be contained in another element other than a smart card.

Finally, the access control managed by the auxiliary processor may be combined with conventional management by the main processor, the final decision of authorizing or not authorizing the access being provided by the result of this combination.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of access control between a main processor and peripheral devices connected by a communication bus, comprising:
    assigning, to at least one program from a plurality of programs to be executed by the main processor, at least one access authorization selectively authorizing access of the at least one program to at least one peripheral device from said peripheral devices, wherein:
        said at least one access authorization is being provided by an auxiliary processor contained in a smart card comprising a memory distinct from a memory of the main processor,
        the memory of the smart card contains security rules used to authorize the access of the at least one program to the at least one peripheral, the security rules indicate which program of the plurality of programs has access to which peripheral device from said peripheral devices,
        the at least one access authorization is distinct from keys authenticating and/or validating the at least one program, and
        the main processor does not modify the security rules and the at least one access authorization; and
    checking, for each request for access by the at least one program to the at least one peripheral device, the presence of said at least one access authorization for the access to the at least one peripheral device.

2. The method of claim 1, wherein said at least one access authorization is provided by said auxiliary processor on each access request to the at least one peripheral device.

3. The method of claim 1, wherein said at least one access authorization is provided by said auxiliary processor upon installation or new use of a program, to define peripheral devices to which the program will further have access.

4. The method of claim 3, wherein said auxiliary processor configures a unit for managing the access to the memory of the main processor by provision of said at least one access authorization.

5. The method of claim 1, wherein at least two of said peripheral devices are formed of an access card to access a mobile telephone network and of an access card to access a wireless local area network, said auxiliary processor authorizing or not authorizing access to one of the networks on each access request completed by the main processor.

6. The method of claim 1, wherein said auxiliary processor forms one of said peripheral devices.

7. A system for controlling access to peripheral devices communicating with a main processor via a bus, the system comprising:
    means for assigning, to at least one program from a plurality of programs to be executed by the main processor, at least one access authorization selectively authorizing access to at least one peripheral device from the peripheral devices, the at least one access authorization being provided by an auxiliary processor contained in a smart card comprising a memory distinct from a memory of the main processor, wherein the memory of the smart card contains security rules that indicate, in a table data structure, which program of the plurality of programs has access to which peripheral device from the peripheral devices, the at least one access authorization is distinct from keys authenticating and/or validating the at least one program, and wherein the main processor does not modify the security rules and the at least one access authorization; and
    means for checking, for each request for access by the at least one program to the at least one peripheral device, the presence of said at least one access authorization for the access to the at least one peripheral device.

8. The system of claim 7, wherein a peripheral device is formed of at least an access interface to a communication network of a local area network type or of a mobile telephone type.

9. An electronic component comprising at least one main processor, comprising means for the processor to behave as the auxiliary processor in implementation of the method of claim 1.

10. An electronic assembly comprising at least one main processor and peripherals wherein access to the peripherals is desired to be controlled, comprising means for implementing the method of claim 1.

11. A system for access control between a main processor and peripheral devices connected by a communication bus, the system comprising:
- a component for assigning, to at least one program from a plurality of programs to be executed by the main processor, at least one access authorization selectively authorizing access to at least one peripheral device from the peripheral devices, the at least one access authorization being provided by an auxiliary processor contained in a smart card comprising a memory distinct from a memory of the main processor, wherein the memory of the smart card contains security rules that indicate which program of the plurality of programs has access to which peripheral device from the peripheral devices, the at least one access authorization is distinct from keys authenticating and/or validating the at least one program, and wherein the main processor does not modify the security rules and the at least one access authorization; and
- a component for checking, for each request for access by the at least one program to the at least one peripheral device, the presence of said at least one access authorization for the access to the at least one peripheral device.

12. The system of claim 11, wherein the at least one access authorization is provided by the auxiliary processor on a request, by a program, for access to a peripheral device.

13. The system of claim 11, wherein the at least one access authorization is provided by the auxiliary processor upon installation or new use of a program, to define peripheral devices to which the program has access.

14. The system of claim 11, wherein the auxiliary processor configures a unit for managing access to the memory of the main processor by provision of the at least one access authorization.

15. The system of claim 11, wherein at least two of the peripheral devices are formed of an access card to provide access to a mobile telephony network and of an access card to provide access to a wireless local area network, wherein the auxiliary processor authorizes access to one of the networks on each access request completed by the main processor.

* * * * *